Figure 1:
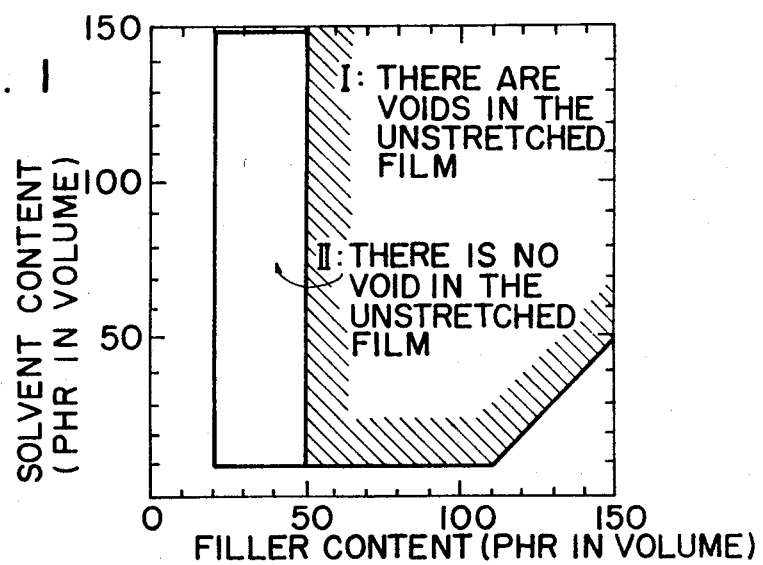

United States Patent [19]
Suzuki et al.

[11] 3,725,520
[45] Apr. 3, 1973

[54] METHOD FOR PREPARING A POROUS SYNTHETIC THERMOPLASTIC FILM OR SHEET

[75] Inventors: Shigemasa Suzuki, Todashi; Kozo Nakamura, Iwakunishi, both of Japan

[73] Assignees: Nippon Ekika Seikei Kabushiki Kaisha; Sanyo Pulp Kabushiki Kaisha, both of Tokyo, Japan

[22] Filed: Apr. 24, 1970

[21] Appl. No.: 31,560

[52] U.S. Cl..................264/41, 161/402, 264/210 R, 264/343, 264/DIG. 13, 264/DIG. 17, 264/DIG. 62
[51] Int. Cl...........................B29d 7/24, B29d 27/00
[58] Field of Search.......264/51, 53, 41, 92, DIG. 13, 264/341, 343, 210 R, DIG. 17, DIG. 62; 161/402

[56] References Cited

UNITED STATES PATENTS

| | | | |
|---|---|---|---|
| 2,312,623 | 3/1943 | Brooks et al. | 264/341 X |
| 2,360,650 | 10/1944 | Crane | 264/341 X |
| 2,979,774 | 4/1961 | Rusignold | 264/343 X |
| 3,256,374 | 6/1966 | Suzuki | 264/343 X |
| 3,320,328 | 5/1967 | Michaels | 264/343 X |
| 3,327,033 | 6/1967 | Koch et al. | 264/343 X |
| 3,470,277 | 9/1969 | Hagen et al | 264/53 |
| 2,987,774 | 6/1961 | Jacobson | 264/53 |
| 3,351,569 | 11/1967 | Revallier et al. | 264/53 UX |
| 3,042,972 | 7/1962 | Lafferty | 264/92 X |
| 3,154,461 | 10/1964 | Johnson | 264/DIG. 13 |
| 3,486,946 | 12/1969 | Duddy | 264/41 X |
| 3,426,754 | 2/1969 | Bierenbaum et al. | 264/210 R UX |

FOREIGN PATENTS OR APPLICATIONS

| | | | |
|---|---|---|---|
| 1,333,302 | 6/1963 | France | 264/53 |

OTHER PUBLICATIONS

Boundy, R. H. et al. Ed. "Styrene Its Polymers, Copolymers and Derivatives," New York, Reinhold, 1952, pp. 574–578, 596–600.
Frank. H. P. "Polypropylene." New York, Gordon and Breach Science Publ., c1968, pp.58–62.

*Primary Examiner*—Philip E. Anderson
*Attorney*—Fred C. Philpitt

[57] ABSTRACT

A method for preparing a porous film or sheet, which comprises admixing together 100 parts by volume of at least one thermoplastic resin, 5 – 150 parts by volume of a solvent, and 20–50 parts by volume of a filler, uniformly dispersing the solvent and the filler in said resin to thereby form a stock, molding a film or sheet from the resulting stock, biaxially stretching the film or sheet at a suitable temperature between the glass transition temperature of the resin and the flow temperature of the resin, and substantially removing the solvent from the film or sheet during the period between the molding and the end of the stretching without foaming.

11 Claims, 8 Drawing Figures

METHOD FOR PREPARING A POROUS SYNTHETIC THERMOPLASTIC FILM OR SHEET

This invention relates to a method for preparing porous sheets and films, and more particularly to porous sheets and films consisting of thermoplastic synthetic resins and fillers, the filler being blended with the thermoplastic synthetic resin by a help of a suitable solvent, and a method for preparing the same.

According to the present invention, from at least 5 parts to not more than 150 parts by volume of a solvent which has a boiling point higher than the flow temperature of a resin in a state coexisting with the solvent but not higher than 230°C and is incapable of completely dissolving the resin at a molding temperature but capable of partially swelling the resin, and from at least 20 parts to not more than 50 parts by volume of a filler which is inert to the resin and stable at a molding temperature are added to 100 parts by volume of at least one of thermoplastic synthetic resins selected from the group consisting of polyolefin groups such as polyethylene and polypropylene; vinyl resin groups such as polyvinyl chloride, polystyrene; and polyvinyl alcohol; polyamide resins; polyester resins, copolymers comprised mainly of monomers of these resins; and a mixture thereof. These three components are allowed to be uniformly dispersed and molded into a sheet or film according to the method well known to those skilled in the art. The thus obtained sheet or film is biaxially stretched according to the method well known to those skilled in the art while removing the solvent or after having removed the solvent, whereby a porous sheet or film is prepared. The thus obtained sheet or film can be used in the similar field where the conventional paper prepared from the pulp or the non-woven fabric or artificial leather prepared from the natural or synthetic fibers are destined to.

Heretofore, a method for forming a sheet from synthetic fibers by a wet process or dry process, a method for making coarse a surface of synthetic resin film or applying an inorganic pigment to the surface of the film, that is, the so-called surface-treating method, a spun bonding method developed by DuPont, USA, a method for preparing a film containing a filler, developed by Union Carbide, USA, a method for preparing a foamed film by forming the entirety of a surface of the film by means of a forming agent, etc. have been well known as methods for preparing synthetic paper or non-woven fabric from synthetic resin as a raw material.

As compared with said conventional methods and sheets or films prepared according to said methods, the present invention can provide porous sheets or films, without using any foaming agents; can provide a matte-like sheets or films having a soft touch or appearance because of fine surface structure; and further can provide a wide variety of sheets or films ranging from a paper-like state to a leather-like state by suitably selecting a thickness and stretching ratio of the sheet or film.

A method for generating voids in the synthetic resin film by using a foaming agent has been well known. Furthermore, the following methods have been well known as the method for generating voids without using a foaming agent.

According to the method disclosed in Japanese Patent Publication No. 2073/67 and owned by Imperial Chemical Industries, Ltd., England, a polyethylene terephthalate film is stretched at a temperature of 40°–70C so that the necking may be brought about, whereby voids are generated. As to polypropylene, similar technique is disclosed in British Patent No. 922,228.

According to the methods disclosed in Japanese Patent Publications Nos. 4338/66 and 7717/67 and owned by Toyo Boseki K.K., Japan, a polyolefin film is stretched at two stages. At the first stretching stage, the film is abruptly stretched to a maximum ratio by controlling a surface temperature of a stretching rolls so that one side of the film may be lower than 40°C, whereby the voids are generated.

According to another method disclosed in Japanese Patent Publication No. 1159/68, a film consisting of a mixture of crystalline polymer and non-crystalline polymer is biaxially stretched to generate voids.

According to the method disclosed in Japanese Patent Publication No. 11825/63 and owned by Montecatini, Italy, a paper-like sheet is prepared from synthetic resin as a raw material. That is, 25 parts by weight (about 8 parts by volume) of particles such as calcium carbonate, silica or sodium silicate having diameters of 1 – 100 microns are added to 100 parts by weight of isotactic polypropylene, and the film molded from this mixture is 2–6 times stretched and quenched, whereby a tracing paper-like film is prepared.

In Montecatini's technique, for example, in the case of calcium carbonate, about 8 parts by volume of the filler is added, as disclosed in said patent publication, to 100 parts by volume of the resin, and no voids are generated at all in the film at the stretching, or a very small amount of voids is generated. Thus, the film has a low opacity and becomes translucent. In other words, a tracing paper-like sheet can be obtained thereby.

A method for obtaining a translucent polypropylene film using a solvent without any filler is disclosed in Italian Patent No. 564919 possessed by Montecatini, Italy.

The Benning et al method (U.S. Pat. No. 3,361,704) is a remarkable one as a method for processing a synthetic resin sheet, which will be used in the similar field to that of the non-woven fabric. According to their method, 30–80 percent by weight of an inactive filler and 10–60 percent by weight of a plasticizer are added to high density polyolefin resin, and a film is prepared from the resulting mixture according to the method well-known to those skilled in the art. The film is heated in a temperature range higher than 45°C but not higher than 5°C below the softening point of said polyolefin resin for 5 to 9 minutes, and then quenched to 30°C or lower, whereby an intransparent, soft sheet having a matte surface is prepared. According to said method, more than 18 parts by volume of the filter are added to 100 parts by volume of the resin, if the specific gravity of the filler is assumed to be 2.7, and thus the said prior art method seems to overlap the present invention, but is greatly different from the present invention in that, in the said prior art method, a soft sheet containing a plasticizer is prepared and the resulting sheet is not porous.

The present inventors have already completed a method for internally combining fine particles by means of a synthetic resin (U.S. Pat. No. 3,256,374) and further developed a method for enlarging voids between fine particles on the basis of said method (Japanese Patent Publication No. 25240/69). The outline of the method disclosed in Japanese Patent Publication No. 25240/69 is given below:

At least 50 parts by volume of a filler and at least 25 parts by volume of a solvent are added to 100 parts by volume of a thermoplastic resin, and a film or sheet is molded from the resulting mixture. By removing the solvent from the film or sheet by evaporation after the molding, voids are generated in the molded film or sheet, because the molded film or sheet itself cannot undergo volume reduction owing to the presence of the filler, in spite of the fact that the volume corresponding to that of the solvent is decreased. By biaxially stretching the film or sheet, the voids are enlarged. In that case, there is a limitation to a volume ratio of the filler and the solvent to the resin in generating voids in the non-stretched, molded film or sheet. In detail, the total sum of the resin and the solvent must exceed the volume of the filler and at least 50 parts by volume of the filler and at least 25 parts by volume of the solvent must be used at the same time. This range corresponds to an area identified by symbol I in FIG. 1.

FIG. 1 shows a relation between an amount of a solvent (PHR by volume) and an amount of a filler (PHR by volume) to generate voids in a film. In FIG. 1, a range identified by symbol I shows an area where voids can be generated in a non-stretched film, and a range identified by symbol II shows an area where there are no voids in a non-stretched film, but the voids can be generated by stretching the film. The axis of abscissa shows an amount of a filler (PHR by volume) and the axis of ordinate shows an amount of a solvent (PHR by volume).

As a result of further researches made by the present inventors, it has been found that voids can be newly generated by adding from at least 20 parts to not more than 50 parts by volume of a filler and from at least 5 parts to not more than 150 parts by volume of a solvent, to 100 parts by volume of a resin, dispersing the filler and the solvent uniformly in the resin by kneading, molding a sheet or film from the resulting mixture and biaxially stretching the thus molded sheet or film. It can be presumed that the voids are generated not by the evaporation of the solvent disclosed in said Japanese Patent Publication No. 25240/69, but by formation of discontinuous portions in the film, because the flow of film materials caused by the stretching cannot be effected smoothly due to the presence of the filler.

Accordingly it is observed that the molded film or sheet having a composition corresponding to a point within the area identified by symbol II in FIG. 1 can undergo generation of voids even by stretching the film without removing the solvent in advance. In this respect, the present invention greatly differs from the prior art. Even by stretching the film or sheet after the solvent has been removed from the film or sheet, voids can be generated, but no voids are generated only by removing the solvent by evaporation from the film having a composition corresponding to a point within the area identified by symbol II in FIG. 1. Thus, it can be presumed that the generation of voids by stretching is due to the obstruction of the material flow by the filler.

The present invention will be now explained in detail:

From at least 5 parts to not more than 150 parts by volume of a solvent which has a boiling point higher than a flow temperature of a resin in a state coexisting with the resin but not higher than 230°C and is incapable of completely dissolving the resin at a molding temperature but capable of partially swelling the resin, and from at least 20 parts to not more than 50 parts by volume of a filler which is inert to the resin and stable at the molding temperature, are added to 100 parts by volume of at least one of thermoplastic synthetic resins selected from the group consisting of polyolefin groups such as polyethylene and polypropylene; vinyl resin groups such as polyvinyl chloride, polystyrene and polyvinyl alcohol; polyamide resins; polyester resins; copolymers comprised mainly of monomers of theses resins; and a mixture thereof. The examples of the solvent are given below:

For the polyolefin resins such as polyethylene and polypropylene, a solvent selected from the group consisting of petroleum naphtha and coal naphtha containing at least 50 percent by volume of aromatic components and having a boiling point of 160° – 230°C, and a solvent mixture containing at least 60 percent by volume of xylene, whose balance is a solvent selected from the group consisting of chlorobenzene, dichlorobenzene, ethylbenzene, diethylbenzene, decalin, tetralin, terpene oil, chlorinated hydrocarbons having a boiling point of 100°–230°C and a mixture of at least two of these solvents, is used.

For polyvinyl chloride, a solvent selected from mixtures containing at least 70 percent by volume of a solvent selected from the group consisting of petroleum naphtha and coal naphtha both having a boiling point of 150°–230°C, xylene and a mixture of at least two of these solvents, whose balance is a solvent selected from the group consisting of cyclohexanone, nitrobenzene, diacetone alcohol and a mixture of at least two of these compounds, is used.

For polyvinyl alcohol, water is used.

For polystyrene, petroleum or coal solvent naphtha having a boiling point of 130°–230°C is used.

For other resins, similar solvent is used according to demand.

The petroleum solvent naphtha used in the present invention as a solvent for the polyolefin resin and the petroleum hydrocarbon oil used in said Benning et al patent belong to different categories as explained below. That is, Benning et al specify the property of petroleum hydrocarbon oil used as a plasticizer by means of viscosity, but it is seen from comparison with the viscosity of the petroleum solvent naphtha used in the present invention, that the petroleum hydrocarbon oil is in quite a different range, as shown in Table 1. As is readily presumable from the viscosity, the volatility of the petroleum hydrocarbon oil is low and after molding the petroleum hydrocarbon oil is present in the molded film or sheet and exerts a plasticizing action. On the other hand, the petroleum solvent naphtha used in the present invention has a high volatility, and after the molding it is readily volatilized and is not retained in the molded sheet or film. That is, there remains no plasticizing action.

TABLE 1

Comparison of viscosity of the plasticizer used in the Benning et al patent with that of the present solvent

| Method | Name of oil | Viscosity (Saybolt Universal, second) | Viscosity (centistokes) |
|---|---|---|---|
| Benning et al. | Fisher Heavy oil[1] | 335–350 at 100°F | 73.2 – 77.8 |
| | Shellflex 310[2] | 256 at 100°F | 55.6 |
| | Shellflex 412[2] | 559 at 110°F | 12.3 |
| Present invention | Swasol 1800[3] | | 1.04 |
| | Swasol 1300[4] | | 0.82 |
| | Hisol[5] | | 0.73 |

Remarks:
1) Product of Fisher Scientific Co.
2) Product of Shell Oil Co.
3) Product of Maruzen Oil Co., Japan, boiling point: 180°C
4) Product of Maruzen Oil Co., Japan, boiling point: 160°C, aromatic content: 98%
5) Product of Showa Oil Co., Japan, boiling point: 150°C, aromatic content: 55%

The filler used in the present invention is selected from the group consisting of calcium carbonate, magnesium carbonate, barium sulfate, powdered silica, mica, kaolin, clay, diatomaceous earth, talc, gypsum, asbestos, rock wool, alumina, aluminum hydroxide, titanium oxide, powdered glass, short glass fibers, white carbon, pulp floc, short synthetic polymers fibers, short natural polymer fibers, natural polymer particles and a mixture of at least two of these members.

When a film or sheet is molded, not more than 10 parts by volume of the filler are usually added to 100 parts by volume of the synthetic resin, because, when more than 10 parts by volume of the filler are added to 100 parts by volume of the synthetic resin, fluidity of the stock becomes worse and the workability at the molding also becomes considerably worse. This means that a sheet or film having a good quality cannot be obtained by molding. In said Benning et al patent, such a trouble is overcome by adding a large amount of a plasticizer to the synthetic resin. That is to say, a large amount of a filler can be added to the resin and a film or sheet having a good surface condition can be obtained according to the Benning et al patent, but the sheet or film is soft because a large amount of the plasticizer is contained in the sheet or film, and further the sheet or film has a high density and no air permeability because there are no voids in the sheet or film.

On the other hand, in the present invention, a large amount of a filler can be mixed with the synthetic resin by lowering the resistance to flow during the molding and retaining no plasticizing effect at all after the molding. More particularly, a solvent which has a boiling point higher than a flow temperature of a resin in a state coexisting with the resin but not higher than 230°C and is incapable of completely dissolving the resin at a molding temperature but capable of swelling the resin. The term "solvent" employed herein means that which satisfies said conditions.

The amounts of the filler and the solvent to be added depend upon the kind of a resin, the kind of a filler, the kind of a solvent and the properties of the desired film or sheet, but must not be beyond the area as identified by symbol II in FIG. 1. When not more than 20 parts by volume of the filler are added to 100 parts by volume of the resin, no voids can be effectively generated by the stretching. When not more than 5 parts by volume of the solvent are added to 100 parts by volume of the resin, it is impossible to completely disperse the filler into the resin and mold a sheet or film of a good quality. When filler exceeds 50 parts by volume and the solvent exceeds 150 parts by volume, voids can be generated by removing the solvent by evaporation from the sheet or film after the molding without stretching the sheet or film, and thus the stretching operation can be interpreted as an action to enlarge the generated voids. Such corresponds to the composition in an area as identified by symbol I in FIG. 1.

As is readily comprehensible, the strength of the sheet or film obtained at the same stretching ratio tends to be lowered with increase in the amount of the filler. As the desired porous sheet or film of the present invention is destined not only to the field of paper, but also to the fields of the non-woven fabric and the artificial leather, it is important to keep the strength higher.

Furthermore, it has been found in the researches of the present inventors that greater air permeability can be obtained by increasing the stretching ratio (see Table 2). Furthermore, it has been found that, in order to obtain an air-permeable sheet or film having a strength high enough to serve as a substitute for the non-woven fabric or artificial leather, it is desirable to stretch a sheet or film molded from a stock having a composition falling under the area as designated by symbol II in FIG. 1.

It is needless to make an explanation of the influence of the amount of the filler upon the strength of the molded sheet or film of synthetic resin, as such is well known to those skilled in the art, but an influence of relative amounts of the filler and the solvent upon the molding workability will be now explained, using the data obtained by the present inventors.

A case where high density polyethylene (Hizex 7,000° F, MI:0.05, density:0.965, a trademark of polyethylene made by Mitsui Sekiyu Kagaku Kogyo K.K. Japan), $CaCO_3$ and solvent naphtha (Swasol 1800, a trademark of solvent naphtha made by Maruzen Oil Co. Japan) are employed together, is hereunder exemplified. The resistance to flow, which represents the molding workability, is shown in FIG. 2.

Figure 2:
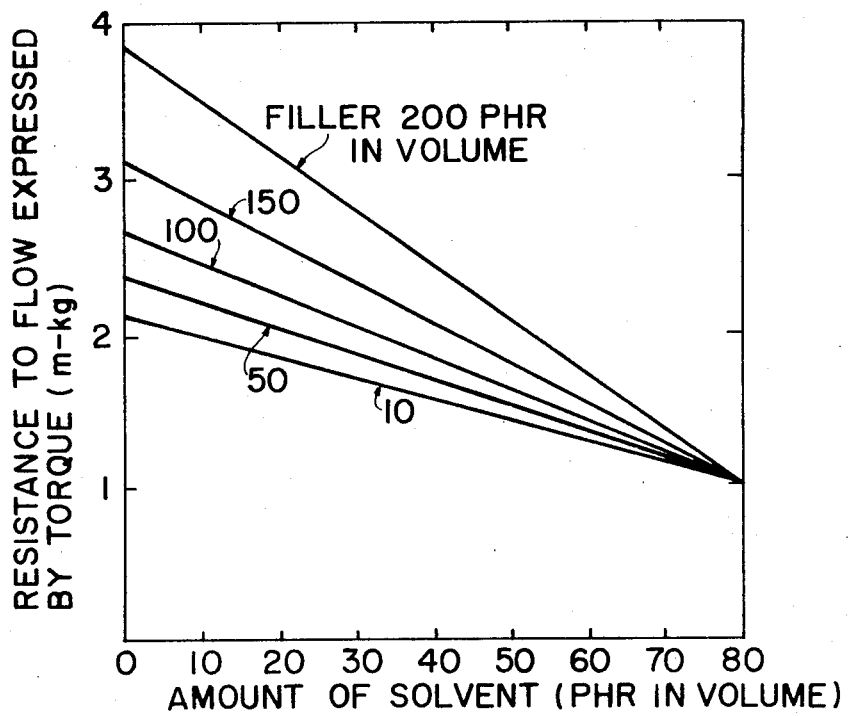

FIG. 2 shows a relation between the amounts of the filler and the solvent and the molding workability. In FIG. 2, the axis of abscissa shows the amount of a solvent (PHR), the axis of ordinate shows a resistance to flow represented by turning torque of a rotor, m. kg. measured by Blanbender's plastograph at 180°C, and lines are plotted for each filler content.

The resin, filler and solvent as mentioned above are mixed together in proportions as mentioned above, and the resulting stock is kneaded in the well-known kneader for plastics, for example, Banbury mixer or Henschel mixer, and a sheet or film is molded from the stock according to the well-known method, for example, extrusion, or calendering. The thus obtained sheet or film still contains 2 to 15 percent by volume of the solvent. The residual solvent can be almost completely removed in the biaxial stretching step or succeeding annealing step, but can be removed by heating before the stretching. Any way, fine voids are generated through the entire sheet or film by biaxially stretching the sheet or film at a suitable temperature between the glass transition temperature and the melting temperature of the base resin, whereby the entire sheet or film is made porous. The mechanism of generating voids by the stretching is not clear yet, but it is evident from such fact that the voids cannot be effectively generated unless at least 20 parts by volume of the filler are uniformly dispersed in 100 parts by volume of the resin, that the presence of over a certain amount of the filler is a necessary condition. As the filler is inert to the resin, it is presumable that the filler will impede the resin flow at the stretching and bring about rupture of continuous structure of the resin, which will be a cause for the generation of the voids.

It is presumable from the following phenomenon that the filler not only acts as an extender, but also plays a positive role. Generally, it has been considered difficult to biaxially stretch polyethylene. Particularly, it is well known that it is difficult to set conditions for biaxial stretching based on two-stage tenter system. When at least 20 parts by volume of a filler are mixed with 100 parts by volume of the resin according to the present invention, the biaxial stretching can be readily carried out at two stages. The microstructure of the thus obtained film is air permeable and contains so many voids, as shown in FIGS. 3 – 8.

Figure 3:
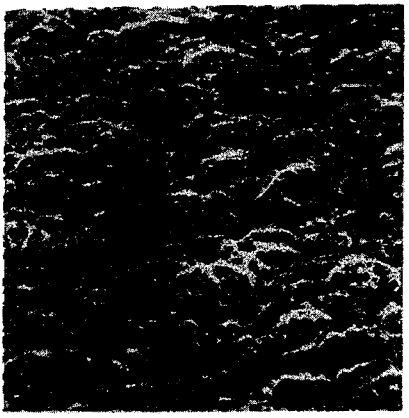
Figure 4:
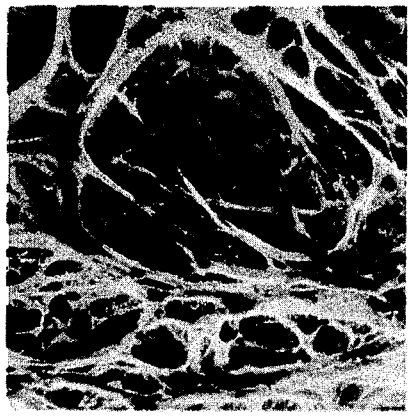
Figure 5:

FIGS. 3 and 4 are scanning electron microscopic pictures of 300 and 3,000 magnifications respectively of the surface of a film and FIG. 5 is a scanning electron microscopic picture of 3,000 magnifications of the cross section of the same film obtained by adding 40 parts by volume of $CaCO_3$, 3 parts by volume of $TiO_2$ and 70 parts by volume of Swasol to 100 parts by volume of high density polyethylene ($d=965$), mixing the stock, molding a film from the resulting stock, removing the solvent from the film and stretching the film four times as long and as wide individually. It is seen that the resin is fibrillated and is in a reticular structure on the whole.

Figure 6:
Figure 7:
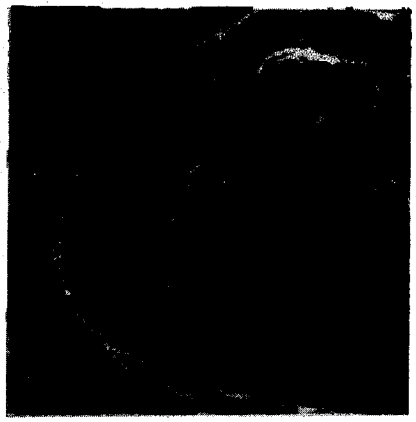
Figure 8:
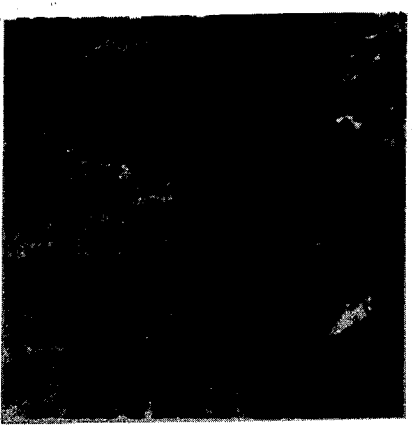

FIGS. 6 and 7 are scanning electron microscopic pictures of 300 and 3,000 magnifications, respectively of the surface of a film and FIG. 8 is a scanning electron microscopic picture of 3,000 magnifications of the cross section of the same film obtained by adding 30 parts by volume of $CaCO_3$, 5 parts by volume of $TiO_2$, 40 parts by volume of xylene and 5 parts by volume of cyclohexane to 100 parts by volume of polyvinyl chloride (mean degree of polymerization: 1,100), molding a film from the resulting stock, and stretching the film twice as long and as wide individually. It is seen that in FIGS. 6, 7 and 8, the resin is not fibrillated but in a porous state.

The porous sheet or film of the present invention can have different appearance and property by suitably selecting the kind and amount of a filler, and thickness and stretching ratio of the film. For example, a white sheet having a higher opacity and an appearance and properties similar to those of the printing paper can be obtained by adding 40 parts by volume of $CaCO_3$ and 2 parts by volume of $TiO_2$ to 100 parts by volume of the resin, molding a sheet having a thickness of 200 microns from the stock and two-dimensionally stretching the sheet four to seven times in area ratio. A white, air-permeable film having a soft and flexible, tanned leather-like touch can be obtained by molding a sheet having a thickness of 1000 microns from the same stock and biaxially stretching the sheet about 7–25 times in area ratio. Further, by increasing the stretching ratio, a tissue paper-like, air-permeable film can be obtained.

The influence of the stretching ratio open the quality of the sheet or film, for example, air permeability, is illustrated in Table 2, referring to the case where 40 parts by volume of a filler ($CaCO_3$) are added to 100 parts by volume of high density polyethylene (Hizex 7,000° F, $d = 0.965$, M.I.= 0.05). That is, better air permeability can be obtained with increase in the stretching ratio. However, when the stretching ratio exceeds 40, the strength of the film is deteriorated and thus the film cannot be used in the fields of the printing paper or non-woven fabric, though it is used in the field of wadding.

TABLE 2

Relation between stretching ratio and air permeability
Resin : Hizex 7000F : 100 parts by volume
Filler : $CaCO_3$ : 40 parts by volume

| Stretching ratio (area ratio) | Air permeability* (second) |
|---|---|
| 4 | 54 |
| 6 | 31 |
| 9 | 26 |
| 16 | 19 |
| 25 | 11 |
| 36 | 5 |

Remark: * Measured by B-type Garley's Densometer (TAPPI Sm-48, ASTM D 726-58)

The thus prepared air-permeable film has such a tendency that the air permeability is increased by increasing the stretching ratio and the rigidity is lowered thereby. In order to prepare a film having a high air permeability and a considerably high rigidity at the same time, a solution prepared by dissolving a synthetic resin having a high Young's modulus, for example, polystyrene or polyvinyl alcohol, in a suitable solvent is applied to the biaxially stretched, air-permeable film by a coating or impregnating method, and then the solvent is removed from the film. The rigidity can be greatly increased by applying the resin to the film, but the air permeability is not so lowered. In examples as shown in Table 2, a xylene solution of 0.1 – 20 percent by weight of polystyrene (Toporex 550, a trademark of Mitsui-Toatsu Kagaku Kogyo K.K. Japan) is applied to the film whose stretching ratio is 16, and then the solvent is removed from the film. A relation among the amount of applied polystyrene and the rigidity and air permeability of the film is shown in Table 3.

TABLE 3

Increase in rigidity by application of a resin having a high Young's modulus

| Polystyrene added (%) | Air permeability[1] (second) | Young's MOdulus[1] (dyne/cm$^2$) |
|---|---|---|
| 0 | 19.3 | $1.17 \times 10^9$ |
| 0.24 | 19.4 | 1.24 " |
| 0.46 | 19.8 | 1.29 " |
| 1.40 | 20.3 | 1.71 " |
| 2.25 | 21.7 | 3.45 " |
| 11.20 | 22.4 | 9.35 " |
| 15.60 | 38.1 | 11.35 " |
| 27.30 | 60.1 | 12.05 " |

Remarks:
1) Measured by Garley's densometer
2) Measured by vibration reed method When a proper amount of antistatic agent is added to the resin to be applied, a great antistatic effect can be obtained with a small amount of the antistatic agent. According to the experiment made by the present inventors, the static charge can be lowered to the degree corresponding to that of the cellulose paper by adding 0.1 percent by weight of an anionic surfactant (Electrostripper H–7, a trade-mark of Kao Sekken K.K., Japan) to the base resin.

Furthermore, by adding a hydrophilic polymer such as polyvinyl alcohol to the film, the rigidity and the antistatic effect can be increased. It is presumable that the fixing of the hydrophilic resin to the hydrophobic film is based on the fact that the present film is in a porous structure and thus an aqueous solution of the resin enters the voids and is fixed therein.

Inorganic materials usually used in paper coating, such as clay, fine calcium carbonate, talc, fine silica, etc., can be applied to the present film by means of a suitable vehicle, to prepare coated paper or art paper.

The present invention will be now illustrated with reference to examples.

EXAMPLE 1

One hundred parts by volume of high density polyethylene (Hizex 7,000F, d=0.965, MI=0.05, made by Mitsui Sekiyu Kagaku Kogyo K.K. Japan) as a resin, 40 parts by volume of calcium carbonate (Whiton SB, average particle size: 3 microns, made by Shiraishi Calcium Kogyo K.K., Japan) as a filler, 3 parts by volume of titanium dioxide (Anatase) as a filler, one part by volume of stearic acid as a lubricant, and 70 parts by volume of solvent naphtha (Swasol 1800, boiling point=180°98 percent, made by Maruzen Oil Company, Japan) as a solvent were kneaded in a Banbury mixer at 170°C for 20 minutes. The thus prepared stock was pelletized by a pelletizer and extruded from a T-die to form a film having a thickness of 300 microns. The thus prepared film was spread over a frame and left to stand at 110°C for 30 minutes. After the amount of residual solvent was made less than 1 percent, the film was stretched three times both as long and as wide at 115°C. The thus obtained film had a thickness of 100 microns, and its air permeability was 31 seconds according to Garley's densometer. It brightness and opacity corresponding to those of quality paper. The film was writable with pencil, ball point pen, or with an aqueous ink.

EXAMPLE 2

The same stock as in Example 1 was kneaded under the same conditions as in Example 1, and extruded from a circular die to prepare a film having a thickness of 100 microns. The thus prepared tubular film was stretched between two sets of pinch rollers at 120°C (so-called tubular stretching). The solvent was evaporated off during the stretching. The stretching ratio was 6 in both longitudinal and lateral directions. The thus obtained film had a thickness of about 15 microns, had a good air permeability, a good water absorbability and a feeling like tissue paper. The air permeability was 5 seconds according to Garley's densometer.

EXAMPLE 3

A stock having the following composition was extruded from a T-die at 180°C to prepare a film having a thickness of 250 microns.

Resin: Polypropylene (Mitsui Polypropylene F 600, MI=7, made by Mitsui-Toatsu Kagaku Kogyo K.K., Japan), 100 parts by volume.

Filler: aluminum hydroxide (C4D, average particle size: 2 microns, made by Showa Denko K.K., Japan), 40 parts by volume, and Solvent: Solvent naphtha (Swasol 1800, boiling point = 180°C, aromatic content 98 percent, made by Maruzen Oil Co. Japan), 70 parts by volume.

The thus obtained film was spread over a frame and the solvent was removed from the film at 130°C for 30 minutes.

The film substantially free of the solvent was stretched four times both as long and as wide. The thus obtained film had a thickness of 70 microns, and had a feeling and flexibility like tanned leather. The air permeability was 20 seconds according to Garley's densometer. A xylene solution of 10 percent by weight of polystyrene (Toporex 550, made by Mitsui-Toatsu Kagaku Kogyo K.K., Japan) was applied to the film, and the excessive solution was wiped off with a sponge. The dried film had an appearance and feeling like cigarette paper, and the air permeability was 25 seconds according to Garley's densometer.

EXAMPLE 4

A stock having the following composition was kneaded in a Ko-kneader, pelletized and extruded from a T-die at 140°C to prepare a film having a thickness of 200 microns.

Resin: polyvinyl chloride (Vinychlon, average degree of polymerization: 1100, made by Sumitomo Kagaku Kogyo K.K., Japan), 100 parts by volume, Filler: diatomaceous earth 6, 20 parts by volume, titanium dioxide (Rutile), 2 parts by volume, pulp floc (Sanyo floc, made by Sanyo Pulp Co., Japan), 80 parts by volume, Solvent: Xylene, 30 parts by volume, cyclohexanone, 10 parts by volume, and Stabilizer:Composite stabilizer consisting of soaps of such metals as cadmium, barium and lead (made by Sankyo Kasei Kogyo K.K. Japan), 1 part by volume.

The thus prepared film was spread over a frame, dried at 80°C, and then stretched twice both as long and as wide.

The thus obtained film had a thickness of about 60 microns and an appearance and feeling like high quality writing paper. The air permeability was 300 seconds according to Garley's densometer.

EXAMPLE 5

A stock having the following composition was kneaded in a Banbury mixer at 120°C for 30 minutes and extruded from a T-die at 150°C to prepare a film having a thickness of 300 microns.

Resin: Polystyrene (Toporex 830, high impact type, made by Mitsui-Toatsu Kagaku Kogyo K.K., Japan), 100 parts by volume, Filler: Clay (Shokozan clay, average particle size: 3 microns, made by Shokozan Mining Co., Japan), 40 parts by volume, titanium dioxide (anatase), 3 parts by volume, and Solvent; Solvent naphtha (Hisol, boiling point: 150°C, aromatic content: 55 percent, made by Showa Oil Co., Japan), 30 parts by volume.

The thus prepared film was spread over a frame and the solvent was removed from the film at 70°C for 40 minutes. Then, the film was stretched three times both as long and as wide at 105°C. The thus obtained film was white and had an appearance and feeling like the high quality paper, and the air permeability was 35 seconds according to Garley's densometer.

EXAMPLE 6

Hundred parts by volume (100 parts by weight) of a high density polyethylene, (Hizex 7000 F, supplied from Mitsui petrochemical Co., Ltd.) having a density of 0.965 and a melt index of 0.05, as a resin; 2 parts by volume (about 6 parts by weight) of rutile type titanium oxide, as a coloring agent, one part by weight of polyethylene wax 400 (low molecular weight, amorphous PE supplied from Mitsui petrochemical Co., Ltd.), 0.5 part by weight of methylene bis ateroamide (supplied from Nippon hydrogen industry Co., Ltd.; ateroamide , a trademark of slipping agent supplied by Kawakami Research Institute Ltd.) and 0.3 part by weight of Stearic acid F-3 (supplied from Mikami research institute Co., Ltd.) as slipping agents and 10 parts by volume (about 10 parts by weight) of petroleum naphtha (Swasol No. 1800 supplied from Maruzen petroleum Co.,Ltd.), were kneaded in a Banbury mixer at a temperature of 220°C for 12 minutes. After passed through a strainer fixed in an extruder having a L/D of 16 in a warmed state, the mixture was made into a film having a thickness of 300 $\mu$ and a width of 14 inches (about 350 mm) by continuously passing through a reverse-L-type calender having four rolls of 8 inches × 20 inches. The resultant film was stretched 2 times in length and three times in width at 123°C to give a permeable film having a thickness of 100 $\mu$.

EXAMPLE 7

Five percent by weight of an anionic surfactant (Electric stripper H-7, made by Kao Sekken K.K., Japan) was added to a polystyrene solution to be coated in Example 3, on the basis of the polystyrene, and a film was prepared in the same manner as in Example 3. Its antistatic effect was determined in the atmosphere at a constant temperature of 20°C and a constant relative humidity of 65 percent. A half life period of charged voltage of the film, which was charged by corona discharge, was determined by means of a Static Honestometer (made by Shishido Trading Co., Japan). The half life period for the film free of the anionic surfactant was over 1,000 seconds, but that for the film containing the anionic surfactant was 10.8 seconds. As the amount of styrene added was 7.5 percent on the basis of the total film, the amount of the antistatic agent was about 0.35 percent on the basis of the total film. Other characteristics were the same as in Example 3.

EXAMPLE 8

The air-permeable film made in Example 1 was dipped in an aqueous solution of polyvinyl alcohol (Kurare Poval 217E, made by Kurashiki Rayon Co., Japan). The polyvinyl alcohol concentration was 0.5 – 10 percent by weight, and 0.1 percent by weight of a surfactant (Emanol, made by Kao Sekken K.K., Japan) was added to said aqueous solution. Excessive solution was wiped off from the film with a sponge, and the film was spread over a frame and dried at 105°C for 1 hour. The physical properties of the thus obtained film are given in Table 4.

TABLE 4

Surface-treating effect by polyvinyl alcohol

| Concentration of polyvinyl alcohol (%) | Amount applied (%) | Air Permeability (seconds) | Young's modulus (dyne/cm$^2$) | Half-life period of charged voltage (second) |
|---|---|---|---|---|
| 0 | 0 | 19.3 | 1.17 × 10$^9$ | ∞ |
| 0.5 | 1.05 | 19.8 | 1.69 " | 8.2 |
| 1.0 | 1.68 | 21.3 | 3.44 " | 7.0 |
| 2.5 | 3.63 | 21.7 | 7.70 " | 5.1 |
| 5.0 | 7.59 | 22.1 | 9.03 " | 3.7 |
| 10.0 | 14.80 | 23.0 | 11.00 " | 2.4 |

We claim:

1. A method for preparing a porous film or sheet, which comprises:
   A. admixing together:
      100 parts by volume of at least one thermoplastic resin,
      5–150 parts by volume of a solvent, and
      20–50 parts by volume of a filler,
   B. uniformly dispersing the solvent and the filler in said resin to thereby form a stock,
   C. molding a film or sheet from the resulting stock,
   D. biaxially stretching the film or sheet at a suitable temperature between the glass transition temperature of the resin and the flow temperature of the resin, and
   E. substantially entirely removing the solvent from the film or sheet during the period between the molding and the end of the stretching without foaming,
   the aforesaid steps being further characterized by the facts that:
   a. said at least one thermoplastic resin is selected from the group consisting of polyolefins, polyvinyls, polyamides, and polyesters,
   b. said solvent has a boiling point between 100° and 230°C., and is selected from the group consisting of
      1. petroleum naphtha and coal naphtha containing at least 50 percent by volume of aromatic components,
      2. a solvent mixture containing at least 60 percent by volume of xylene with the balance being a solvent selected from the group consisting of chlorobenzene, dichlorobenzene, ethylbenzene, diethyl-benzene, decalin, tetralin, terpene oil, chlorinated hydrocarbons having a boiling point of 100° – 230°C and a mixture of at least two of these solvents,
      3. a solvent mixture containing at least 70 percent by volume of a solvent from the group of petroleum naphtha, coal naphtha having a boiling point of 150°–230°C., xylene and a mixture of these two solvents with the balance being a solvent selected from the group consisting of cyclohexanone, nitrobenzene, diacetone alcohol and a mixture of at least two of these compounds and
4. water,
c. said solvent is incapable of completely dissolving the resin of (a) at the temperature of molding step (C), but capable of partially swelling the resin,
d. said filler is inert to the resin of (a) and stable at the temperature of molding and comprises at least one member selected from the group consisting of calcium carbonate, magnesium carbonate, barium sulfate, powdered silica, mica, kaolin, clay, diatomaceous earth, talc, gypsum, asbestos, rock wool, alumina, aluminum hydroxide, powdered glass, glass fiber, white carbon, titanium dioxide, pulp floc, wood sawdust, and synthetic polymer short fibers.

2. A method for preparing a porous film or sheet, which comprises:
A. admixing together:
100 parts by volume of at least one thermoplastic resin,
5–150 parts by volume of a solvent, and
20–50 parts by volume of a filler,
B. uniformly dispersing the solvent and the filler in said resin to thereby form a stock,
C. molding a film or sheet from the resulting stock,
D. biaxially stretching the film or sheet at a suitable temperature between the glass transition temperature of the resin and the flow temperature of the resin, and
E. substantially entirely removing the solvent from the film or sheet during the period between the molding and the end of the stretching without foaming,
the aforesaid steps being further characterized by the facts that:
a. said at least one thermoplastic resin is selected from the group consisting of polyolefins, polyvinyls, polyamides, and polyesters,
b. said solvent has a boiling point between 100° and 230°C.,
c. said solvent is incapable of completely dissolving the resin of (a) at the temperature of molding step (C), but capable of partially swelling the resin,
d. said filler is inert to the resin of (a), and
e. said filler is stable at the temperature of molding.

3. A method according to claim 2 wherein said thermoplastic resin is a polyolefin and said solvent is selected from the group consisting of (a) petroleum- and coal- naphtha containing at least 50 percent by volume of aromatic components and having a boiling point of 160°–230°C and (b) a solvent mixture containing at least 60 percent by volume of xylene, with the balance being a solvent selected from the group consisting of chlorobenzene, dichlorobenzene, ethylbenzene, diethylbenzene, decalin, tetralin, terpene oil, chlorinated hydrocarbons having a boiling point of 100° – 230°C and a mixture of at least two of these solvents.

4. A method according to claim 2 wherein said thermoplastic resin is a polyvinyl resin and said solvent is selected from mixtures containing at least 70 percent by volume of a solvent selected from the group consisting of petroleum- and coal-naphtha having a boiling point of 150° - 230°C, xylene and a mixture of at least two of these solvents, with the remainder being a solvent selected from the group consisting of cyclohexanone, nitrobenzene, diacetone alcohol and a mixture of at least two of these compounds.

5. A method according to claim 2 wherein said thermoplastic resin is polystrene and said solvent is selected from the group consisting of petroleum- and coal- solvent naphtha having a boiling point of 130° – 230°C.

6. A method according to claim 2, wherein the filler is at least one member selected from the group consisting of calcium carbonate, magnesium carbonate, barium sulfate, powdered silica, mica, kaolin, clay, diatomaceous earth, talc, gypsum, asbestos, rock wool, alumina, aluminum hydroxide, powdered glass, glass fiber, white carbon, titanium dioxide, pulp floc, wood sawdust, and synthetic polymer short fibers.

7. A method according to claim 2 wherein the biaxially stretched air-permeable film or sheet is thereafter coated with a final thermoplastic polymeric resin having a higher Young's modulus than that of the thermoplastic polymeric resin that was used to form the stretched film.

8. A method according to claim 7 wherein said final thermoplastic polymeric resin is polystyrene.

9. A method according to claim 7 wherein said final thermoplastic polymeric resin is polyvinyl alcohol.

10. A method according to claim 6 wherein said final thermoplastic polymeric resin is admixed with an antistatic agent.

11. A method according to claim 10 wherein said antistatic agent is an anionic surfactant.

* * * * *